June 17, 1930.  E. P. ALLARD  1,764,140
AUTOMATIC MILK COOLING DEVICE
Filed June 25, 1929   2 Sheets-Sheet 2
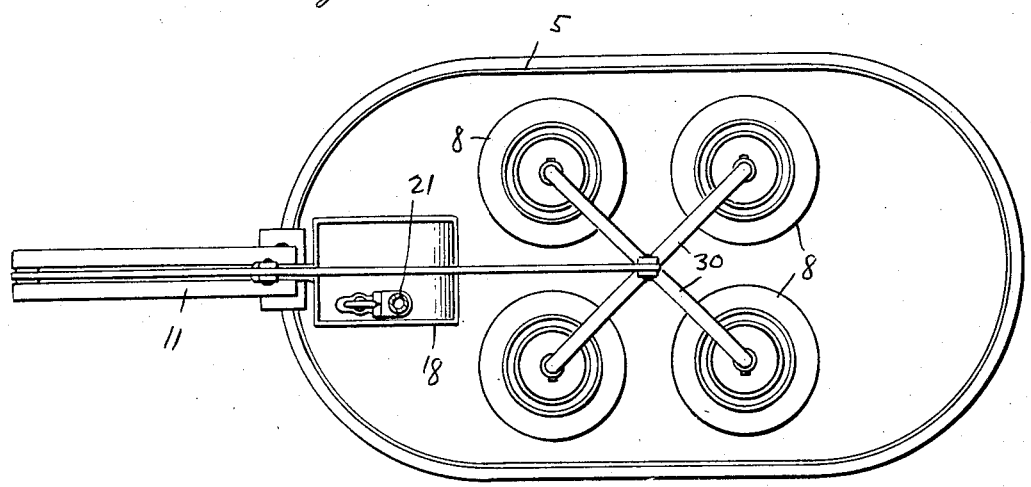
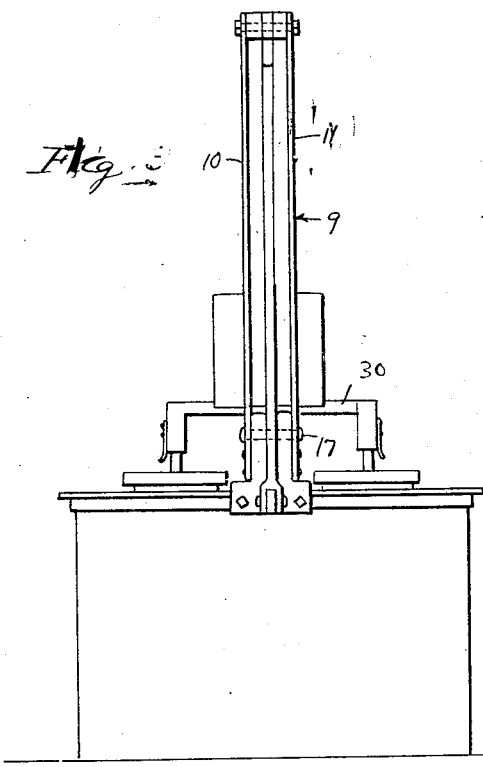
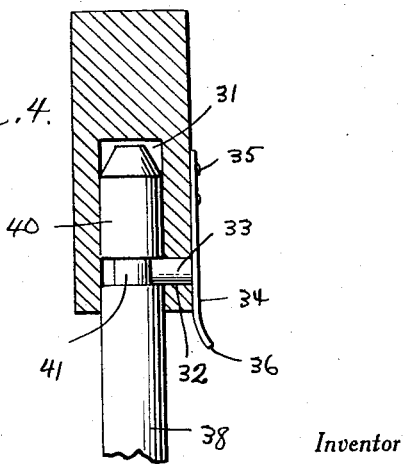
Inventor
Elmer P. Allard
By Clarence A. O'Brien
Attorney Patented June 17, 1930

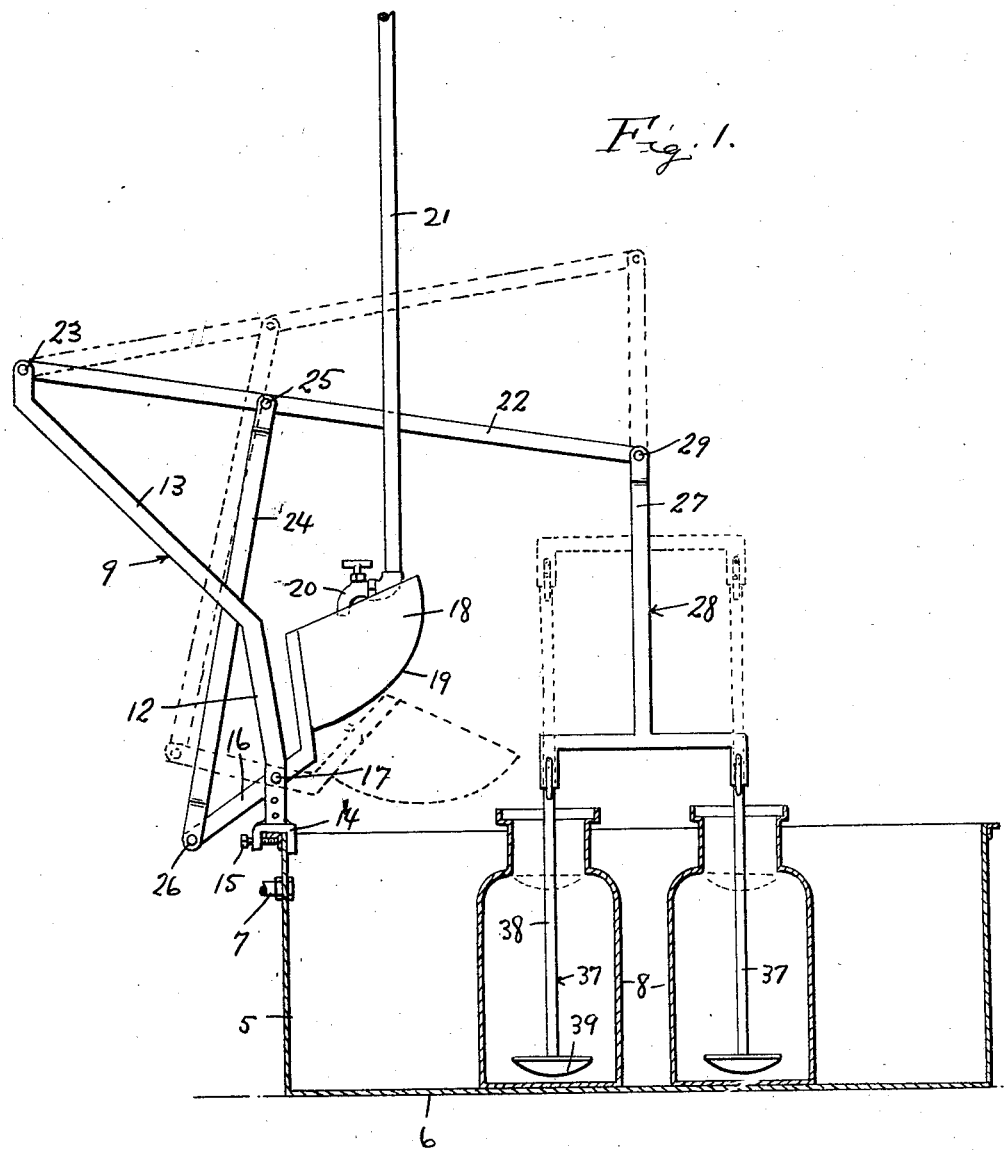

1,764,140

UNITED STATES PATENT OFFICE

ELMER P. ALLARD, OF BRADLEY, WISCONSIN

AUTOMATIC MILK-COOLING DEVICE

Application filed June 25, 1929. Serial No. 373,536.

This invention relates to automatic milk cooling devices and an object of the invention is to provide for utilizing the water used as a cooling medium to agitate the milk so as to quicken the cooling operation.

Further objects of the invention are to provide, in a manner as hereinafter set forth, a device of the character referred to, which is strong, compact and durable, thoroughly reliable in its operation, very simple in its method of assembly and comparatively inexpensive to manufacture and operate.

In the drawings, wherein like reference characters denote corresponding parts throughout the several views:

Figure 1 is a sectional view of a milk cooling trough in which are supported receptacles and illustrating an adaptation therewith of the device in accordance with this invention.

Figure 2 is a top plan view thereof.

Figure 3 is an end view thereof, and

Figure 4 is a sectional view of the socket formed on the end of one of the spider legs illustrating a fragmentary portion in detail of one of the stirring arms, connected therewith.

Referring to the drawings in detail, wherein is disclosed an embodiment of the invention, 5 is a hollow receptacle or trough having a bottom 6 and an open top. The trough 5 is adapted to hold water or other cooling medium and is further provided with an outlet 7 of any predetermined height in its side wall, so that the depth of the cooling medium can be regulated as desired.

Supported in the trough 5 are a plurality of receptacles 8, and the number thereof will be determined by the size of the trough supporting them. While the trough 5 assumes the proportions shown in the drawings, and the receptacles 8 are four in number, it is within the contemplation of the invention to utilize the size of trough desired whereby the number of receptacles 8 may be increased accordingly. The receptacles 8 are disposed in vertical positions and the water or other cooling medium will rise about the walls thereof, whereupon the heat of the liquid in the receptacle will be conducted through the walls thereof and absorbed by the cooling medium. It is furthermore pointed out that while the invention is particularly adaptable to cooling milk in dairies it is equally adaptable for cooling other liquids in receptacles. The rigid supporting arm indicated generally at 9 is formed of a pair of spaced bars 10, 11, which extend from the open top of the casing.

The arm 9 is formed at its lower end with an upright portion 12 and an offset portion 13, at its upper end. The lower ends of the bars 10, 11 are riveted to the body portion of a substantially U-shaped clamp 14, which straddles the upper edges of the trough 5. One of the legs of the clamp 14 has a bolt threadably extending therethrough having the inner end thereof in detachable abutment with the marginal edges of the trough whereby the entire arm is detachably connected with said trough.

An angular arm 16 is rockably mounted intermediate its ends on a pivot 17 extending between the bars 10 and 11 and has a hollow bucket 18 rigidly secured to the free ends thereof. The bucket is open at its top and has an arcuate bottom wall 19 for disposition at an inclination to a horizontal plane so that water will be emptied therefrom in the latter position. The path of movement of the bucket 18 is disposed in vertical alignment with the vertical column of water flowing from the spigot 20 on the end of a water conducting line 21. A lever arm 22 is rockably connected at its outer end as at 23, to the upper of the supporting arms 9. A link 24 is pivoted as at 25, at its upper end outwardly from the center of the lever arm 22. The link 24 extends downwardly from its upper pivot and the lower end thereof is pivoted to the outer end of the beam 16, as at 26. The link 24 extends between the bars 10 and 11 of the rigid supporting arm 9.

The shank 27 of a spider indicated generally at 28 is suspended on the inner end of the lever arm 22 by means of the pivot 29, and at the bottom of the shank 27, there are formed any number of spider feet 30, as will be desired. The feet 30 project outwardly from the shanks 27 and the inner ends thereof are turned at right angles and formed with sockets 31. Adjacent the lower end of the right angled portions of the legs 30, the walls are provided with an opening 32, extending into the socket 31, in which is slidably mounted a pin 33. The outer end of the pin 33 is supported on a plate spring 34, which is secured at its upper end as at 35, to the walls of the feet 30. The outer end of the spring 34 projects below the lower end of the feet 30 as at 35, whereby a tug on the spring will release the pin 33 out of engagement with the socket 31. It will be clearly understood from Figure 2 of the drawings that each of the feet 30 is formed with right angled turns at their outer ends and these feet are provided with the sockets 31 extending into the lower ends of the feet. A member indicated generally at 37 is formed with a shank 38 which extends into the receptacle provided in the trough and on the lower end of the shank 38 is a cupped plate 39, which agitates the liquid in the containers 8 when the stirrers are moved upwardly and downwardly in a vertical plane, as will presently appear.

It is to be understood that there is one stirrer member 37 provided for each receptacle and each stirrer is connected at its upper end with the feet of the spider. The upper end of the shank 38 extends into the socket 31, as at 40, and is provided on the portion within the socket with an annular groove 41, in which the inner end of the pin 33 is adapted to be detachably anchored.

It will be seen by referring to Figure 4 of the drawings that the stirrer members 37 may be detached from the spider feet 30 by pressing outwardly on the end 36 of the spring 34, whereby the pin 33 is unseated from the groove 41, whereupon the shank 38 may be removed from the socket 31.

In the application of the invention, a column of water is constantly flowing in a vertical plane out of the spigot 20 into the trough 5, but by reason of the bucket 18 being disposed in a rockable path within the column of water, the weight of the water at the uppermost end of its path will cause the bucket 18 to rock downwardly to the position shown in Figure 1 of the drawings, by the dotted lines. By reason of the fact that the arcuate bottom 19 of the bucket 18 is disposed at an inclination to a horizontal plane, at the lowest point of its path, all of the water will be emptied into the trough 5 therefrom.

The lowest point in the path of the bucket 18, causes the spider with all its stirring arms to be raised to its highest point as indicated by dotted lines in Figure 1 and after the water has been emptied the weight of the spider and stirring members will force the bucket upwardly whereupon it will become filled with water again. The motion of the bucket 18 will impart a vertical motion to the stirring members 37 whereupon the milk or other liquid in the receptacles 8 will be constantly agitated and consequently will promote faster cooling.

Another important feature of the invention is pointed out in so far as the stirring members 37 may be quickly and easily detached from the spider feet 30 for the purposes of cleaning. It is to be noted that the stirring operation is very economical inasmuch as it would be necessary to supply the trough 5 with a circulating cooling medium and the present invention utilizes the cooling medium to agitate the liquid to be cooled.

I claim:

1. In combination with a reservoir including an outlet and a column of water flowing into the reservoir, of a supporting arm having one end connected with the reservoir, a lever arm having one end pivotally connected to the other end of the support arm, a stirring arm, means for detachably and pivotally connecting the stirring arm to the other end of said lever arm, a beam rockably connected to the supporting arm, a bucket secured to the beam and disposed in the path of incoming water and a link connecting the beam with the lever arm for translating rocking movement of the beam into oscillatory movement of the stirring arm.

2. In combination with a reservoir including an outlet and a column of water flowing into the reservoir, of a supporting arm having one end connected with the reservoir, a lever arm having one end pivotally connected to the other end of the support arm, a stirring arm, means for detachably and pivotally connecting the stirring arm to the other end of said lever arm, a beam rockably connected to the supporting arm, a bucket secured to the beam and disposed in the path of incoming water and a link connecting the beam with the lever arm for translating rocking movement of the beam into oscillatory movement of the stirring arm, said means including a spider having sockets in the ends of the legs thereof to receive the end of the stirring arm and a spring pressed latch associated with the sockets in the spider legs for detachably locking the stirring arms therein.

3. In combination with a reservoir including an outlet and a column of water flowing into the reservoir, of a supporting arm having one end connected with the reservoir, a lever arm having one end pivotally connected to the other end of the support arm, a stirring arm, means for detachably and pivotally connecting the stirring arm, to the other end of said lever arm, a beam rockably connected to the supporting arm, a bucket secured to the beam and disposed in the path of incoming water and a link connecting the beam with the lever arm for translating rocking movement of the beam into oscillatory movement of the stirring arm, said bucket formed with a bottom inclined with respect to a horizontal plane.

4. In combination with a reservoir including an outlet and a colmun of water flowing into the reservoir, of a supporting arm having one end connected with the reservoir, a lever arm having one end pivotally connected to the other end of the support arm, a stirring arm, means for detachably and pivotally connecting the stirring arm to the other end of said lever arm, a beam rockably connected to the supporting arm, a bucket secured to the beam and disposed in the path of incoming water and a link connecting the beam with the lever arm for translating rocking movement of the beam into oscillatory movement of the stirring arm, said means including a spider having sockets in the ends of the legs thereof to receive the end of the stirring arm and a spring pressed latch associated with the sockets in the spider legs for detachably locking the stirring arms therein, and a cup-shaped plate secured on the lower end of the stirring arm for agitating the liquid to be cooled.

In testimony whereof I affix my signature.

ELMER P. ALLARD.